(12) United States Patent
Kimura et al.

(10) Patent No.: US 6,996,516 B1
(45) Date of Patent: Feb. 7, 2006

(54) APPARATUS FOR ANALYZING SOFTWARE AND METHOD OF THE SAME

(75) Inventors: Hiroaki Kimura, Tokyo (JP); Masahiro Noguchi, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 944 days.

(21) Appl. No.: 09/241,735

(22) Filed: Feb. 2, 1999

(30) Foreign Application Priority Data

Feb. 5, 1998 (JP) .................................. 10-024357

(51) Int. Cl.
*G06F 9/45* (2006.01)

(52) U.S. Cl. .............................. 703/22; 703/13; 714/4; 714/1; 714/5

(58) Field of Classification Search ................ 395/500; 434/363; 717/7, 9, 5, 2, 1; 704/9, 4; 707/1
See application file for complete search history.

(56) References Cited

U.S. PATENT DOCUMENTS

| 5,778,212 A | * | 7/1998 | Dehnert et al. ................ 717/5 |
| 5,892,947 A | * | 4/1999 | DeLong et al. ................ 717/1 |
| 5,963,739 A | * | 10/1999 | Homeier ........................ 717/4 |
| 6,282,701 B1 | * | 8/2001 | Wygodny et al. .............. 717/4 |

FOREIGN PATENT DOCUMENTS

| JP | 10-289102 | 10/1998 |
| JP | 10-289124 | 10/1998 |

* cited by examiner

*Primary Examiner*—Jean R. Homere
*Assistant Examiner*—Fred Ferris
(74) *Attorney, Agent, or Firm*—Connolly Bove Lodge & Hutz LLP; Larrry J. Hume

(57) ABSTRACT

An apparatus has program analysis information generation device for automatically generating program analysis information by analyzing a computer program, and program analysis information storage device for sequentially storing the generated program analysis information in a predetermined data recording medium in arbitrary units. A plurality of kinds of program analysis information generated by the program analysis information generation device are stored in the data recording medium as a database every time individual analysis information is obtained. Hence, upon obtaining program analysis information for a large-scale program, even when the memory capacity that can be mounted on a computer is limited, target program analysis information can be reliably obtained without encountering any memory shortage during analysis.

37 Claims, 4 Drawing Sheets

F I G. 2

| METRICS INFORMATION | REDUNDANCY INFORMATION | MAINTENANCE DOCUMENT INFORMATION | ------ |
|---|---|---|---|
| PROGRAM DEPENDENCE GRAPH | | MODULE I/O INFORMATION | ------ |
| DATA FLOW INFORMATION | | | ------ |
| CALL GRAPH | | FLOW GRAPH | ------ |
| SYNTACTIC ANALYSIS TREE (INCLUDING SYMBOL TABLE) | | | ------ |

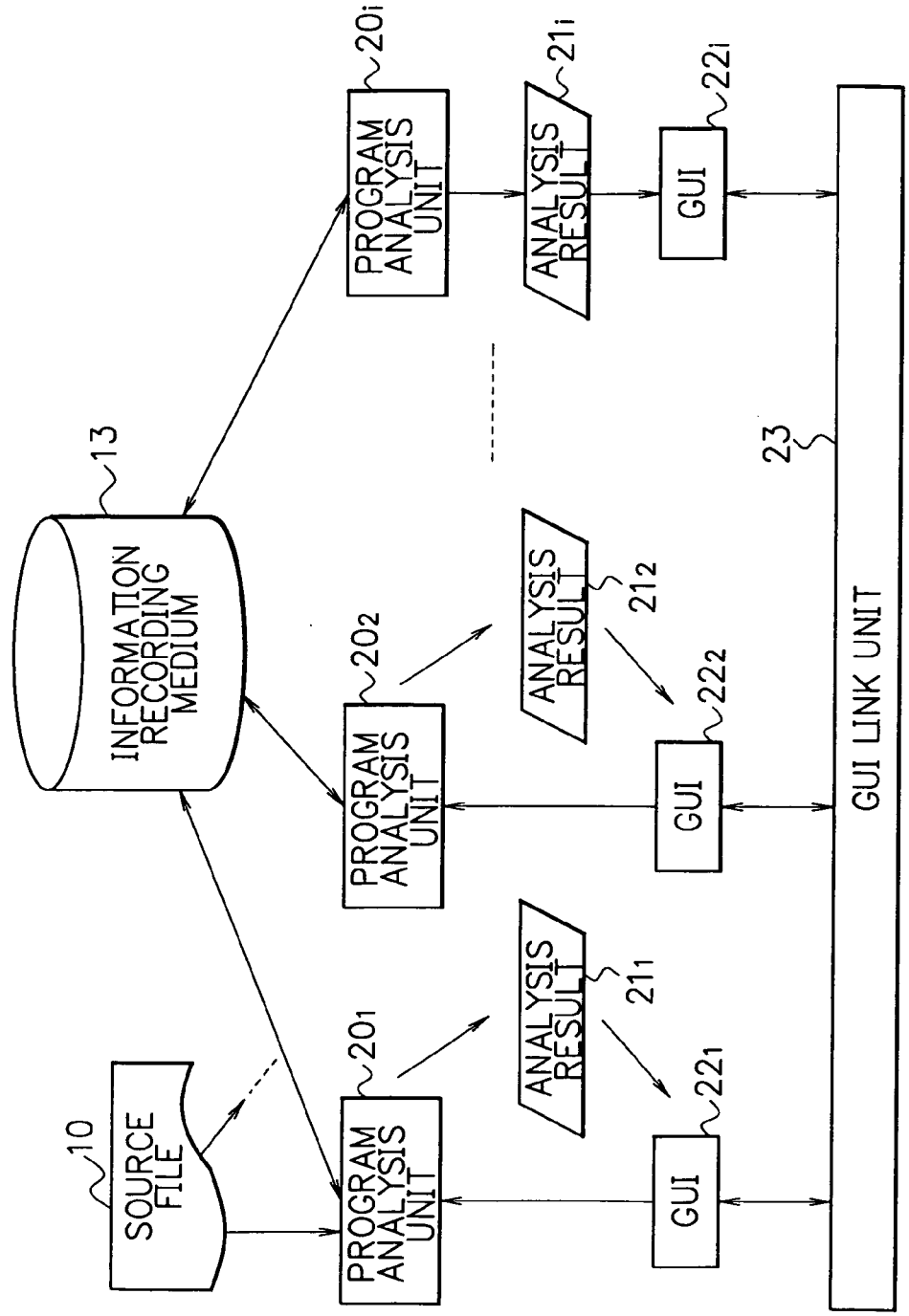

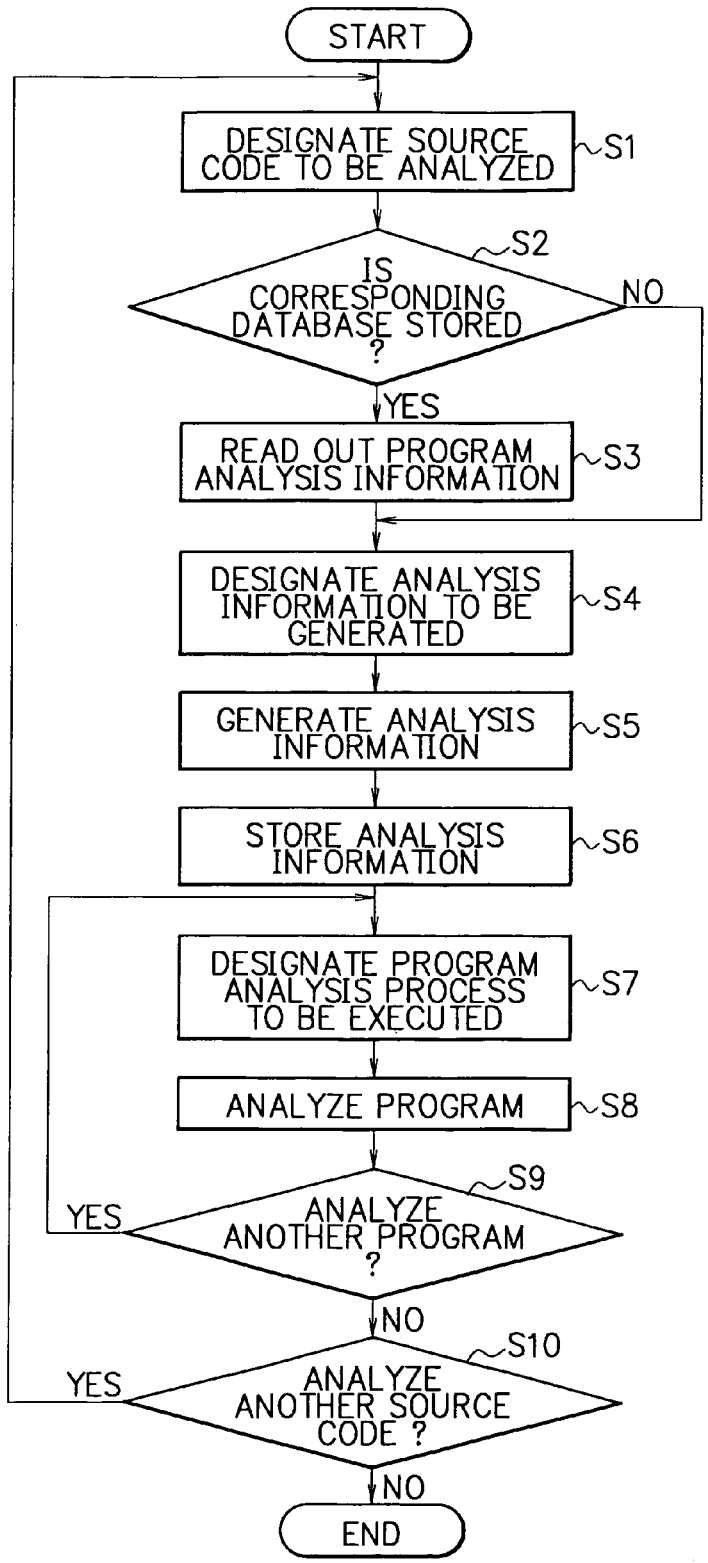

US 6,996,516 B1

APPARATUS FOR ANALYZING SOFTWARE AND METHOD OF THE SAME

BACKGROUND OF THE INVENTION

1. Field of the Invention

The present invention relates to a software analysis apparatus and method for analyzing a computer program to help the user easily understand the contents of the computer program, and a recording medium that stores a program for implementing such functions.

2. Description of the Related Art

When a large number of programmers develop a large-scale program in collaboration or maintain a program already in existence, they must understand a program written by other programmers. However, it is often difficult for a given programmer to understand a program written by another programmer. Also, in the process of developing a program, a programmer must often check a portion that was developed by himself or herself in the past. However, as the program scale becomes larger, the load of the programmer increases even upon checking a program written by himself or herself.

Conventionally, an apparatus which provides various kinds of information by automatically analyzing program source code to help understand a program has been proposed. For example, a conventional apparatus and method for generating a call graph or flow graph by analyzing program source code to allow a programmer to visually recognize the program have been proposed and are disclosed in, e.g., Japanese Patent Application Nos. 9-32415, 9-32452, previously filed by the present applicant.

Note that the "call graph" shows a calling relationship among procedures ("functions" in C) that compose a program. Nodes of this graph represent procedures, and edges represent the calling relationship among the procedures. When this call graph is graphically displayed, the programmer not only can visually recognize the calling relationship among the procedures but also can easily understand the structured level and contents of a program or can easily detect an unwanted procedure call.

On the other hand, the "flow graph" shows the flow of control in a given procedure. Nodes of this graph represent fundamental blocks (each consisting of a continuous sentence sequence, and after control shifts to the first sentence, it reaches to the last sentence without any halt or branch in the middle of execution), and edges represent the flow of control among the fundamental blocks. As for this flow graph, when its information is graphically displayed, the control flow in that procedure can be visually recognized, and unwanted control flow can be easily detected.

However, when a large-scale program, e.g., a program including more than million steps is to be analyzed, the volume of analysis information required for program analysis also becomes very large. For this reason, the maximum memory capacity (main storage device used as a work memory) that a normal workstation or personal computer can mount is insufficient for all pieces of analysis information, or the time required for analysis becomes very long.

For example, when the memory capacity becomes short during analysis, and no more analysis information can be stored in a memory, analysis for the remaining program cannot be done. In such case, after some measure is taken, e.g., the program to be analyzed is segmented or re-formed into some pieces, the program must be analyzed again from the beginning, resulting in poor analysis efficiency.

When the program to be analyzed is segmented into some pieces, analysis that must be done over the entire program, e.g., influence analysis which detects the influence of a change in value of a given variable in the program on other parts cannot yield appropriate analysis information.

Furthermore, analysis may be interrupted due to some cause other than memory shortage during program analysis. In such case, the analysis results previously obtained cannot be used, and program analysis must be redone from the beginning, resulting in poor analysis efficiency.

SUMMARY OF THE INVENTION

The present invention has been made in consideration of the above situation, and has as its object to reliably analyze a large-scale program even when the memory capacity that can be mounted on a computer is limited.

It is another object of the present invention to efficiently use analysis information obtained before interruption even when analysis is interrupted due to some cause during program analysis.

In order to achieve the above objects, a software analysis apparatus according to the present invention is characterized by comprising program analysis information generation means for automatically generating program analysis information required for analyzing a computer program, program analysis information storage means for sequentially storing the program analysis information generated by the program analysis information generation means in a predetermined data recording medium in an arbitrary unit or at an arbitrary timing, and program analysis means for executing program analysis by reading out the program analysis information from the data recording medium.

Also, a software analysis method according to the present invention is characterized by comprising the program analysis information generation step of automatically generating program analysis information required for analyzing a computer program, the program analysis information storage step of sequentially storing the program analysis information generated in the program analysis information generation step in a predetermined data recording medium in an arbitrary unit or at an arbitrary timing; and the program analysis step of executing program analysis by reading out the program analysis information from the data recording medium.

Furthermore, a computer readable recording medium according to the present invention is characterized by recording a program for making a computer implement a program analysis information generation function of automatically generating program analysis information required for analyzing a computer program, a program analysis information storage function of sequentially storing the program analysis information generated by the program analysis information generation function in a predetermined data recording medium in an arbitrary unit or at an arbitrary timing, and a program analysis function of executing program analysis by reading out the program analysis information from the data recording medium.

BRIEF DESCRIPTION OF THE DRAWINGS

FIG. 2 shows an example of the structure of analysis information stored in a database by the software analysis apparatus according to the embodiment of the present invention;

FIG. 3 is a block diagram for explaining a program analysis processing unit according to the embodiment of the present invention in detail; and FIG. 4 is a flow chart showing the operation of the software analysis apparatus of the embodiment, i.e., the sequence of a software analysis method according to the embodiment of the present invention.

DETAILED DESCRIPTION OF THE PREFERRED EMBODIMENT

Figure 1:
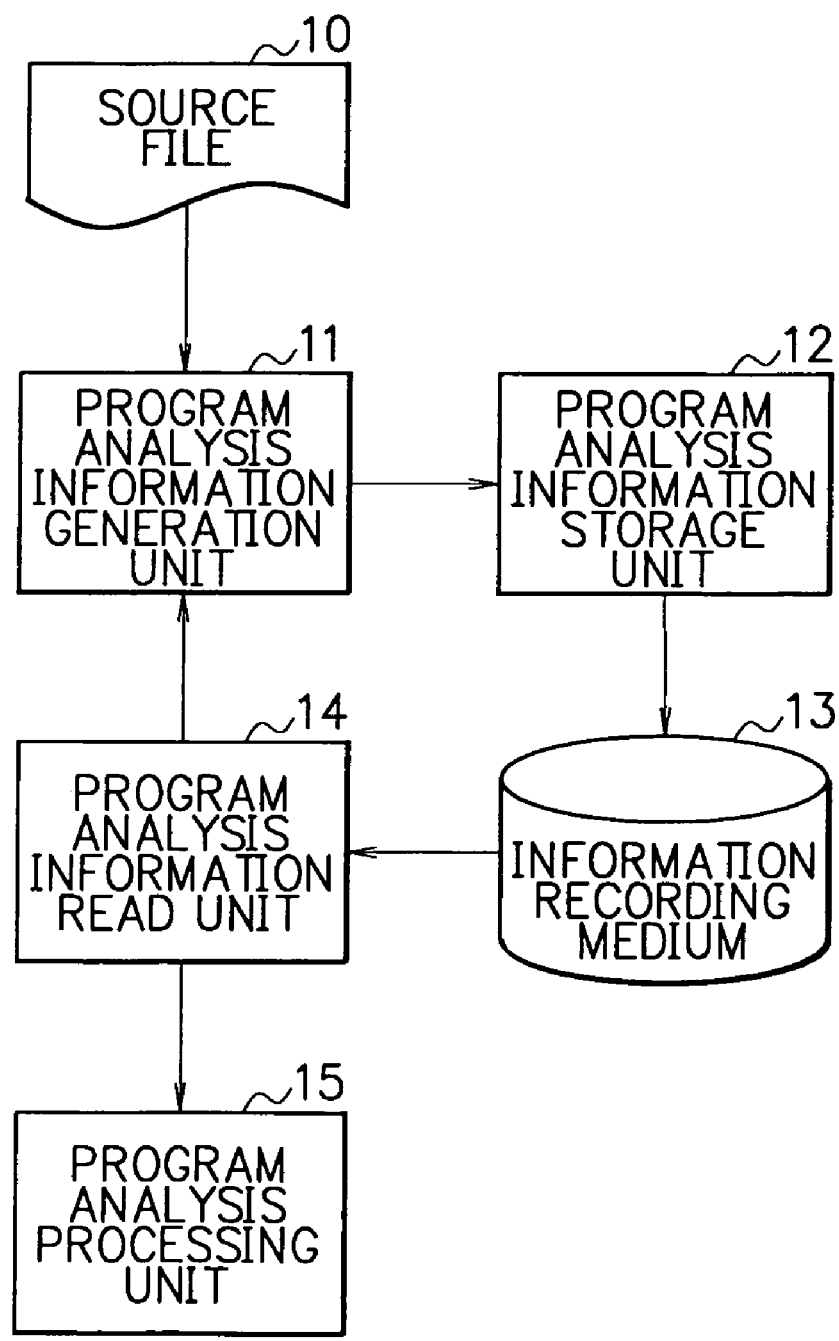
FIG. 1 is a block diagram for explaining an embodiment of a software analysis apparatus according to the present invention.

The preferred embodiment of the present invention will be described hereinafter with reference to the accompanying drawings. FIG. 1 is a block diagram for explaining an embodiment of a software analysis apparatus according to the present invention, FIG. 2 shows an example of the structure of analysis information stored in a database by the software analysis apparatus according to the embodiment of the present invention, FIG. 3 is a block diagram for explaining a program analysis processing unit according to the embodiment of the present invention in detail, and FIG. 4 is a flow chart showing the operation of the software analysis apparatus of the embodiment, i.e., the sequence of a software analysis method according to the embodiment of the present invention.

Referring to FIG. 1, a source file 10 records source code of a program written in a predetermined language (e.g., C). The source file 10 is loaded into a program analysis information generation unit 11. The program analysis information generation unit 11 executes a process for generating predetermined program analysis information required for program analysis in accordance with user's instructions (by various methods, e.g., interactive inputs with a computer, inputs of setup files, and the like).

A program analysis information storage unit 12 sequentially stores program analysis information in a database on an information recording medium 13 such as a hard disk every time the program analysis information generation unit 11 generates program analysis information. More specifically, every time one program analysis information is generated, the program analysis information generation unit 11 informs the program information storage unit 12 of generation of the message. Upon receiving the message, the program analysis information storage unit 12 stores the program analysis information generated at that time on the information recording medium 13.

Upon executing a program analysis process, a program analysis information read unit 14 reads out program analysis information required for a program analysis processing unit 15 from the information recording medium 13, and supplies it to the program analysis processing unit 15.

When the program analysis information volume required for previous program analysis is insufficient or generation of analysis information is interrupted, and some pieces of program analysis information are already stored in the information recording medium 13, the program analysis information read unit 14 reads out information indicating that some pieces of information are stored in the information recording medium 13, and the stored analysis information, and the program analysis information generation unit 11 generates required program analysis information based on the readout information.

The program analysis information generation unit 11, program analysis information storage unit 12, program analysis information read unit 14, and program analysis processing unit 15 are implemented by a computer comprising a CPU, ROM, RAM, and the like, in practice. The computer comprises a main storage device (to be referred to as a memory hereinafter) for temporarily storing program analysis information generated by the program analysis information generation unit 11 before the information is transferred to the information recording medium 13.

In this embodiment, program analysis information contains a syntactic analysis tree (including a symbol table), call graph, flow graph, data flow information, program dependence graph, module I/O information, metrics information, redundancy information, maintenance document information, for example, as shown in FIG. 2. Of this information, the syntactic analysis tree, call graph, flow graph, data flow information, program dependence graph, module I/O information, for example, are generated by the program analysis information generation unit 11 shown in FIG. 1, while the metrics information, redundancy information, maintenance document information, for example, are generated by a program analysis unit $20_i$, shown in FIG. 3, that analyzes a program by a batch process.

Note that the "symbol table" includes a group information that represent meanings of symbols (variables) used in a program, For example, when character "a" is used at different locations in a program, they may indicate identical variables or different variables. For example, when variables expressed by an identical character are used in two different functions, if those variable are global variables, they are identical ones; if the variables are locally defined in the individual functions, they are different ones.

Hence, if there are a plurality of variables described using an identical character at different locations in a program, whether they are identical or different ones cannot be immediately identified. The symbol table manages information pertaining to such symbols. By looking up this table, whether variables indicated by an identical symbol are identical or different ones can be determined.

Also, the "syntactic analysis tree" expresses a program configuration using a tree structure. Upon analyzing a program, syntactic analysis is done first. In this case, a source program is expressed by a tree structure so that the computer can easily understand it.

The "call graph" shows a calling relationship among procedures ("functions" in C) that compose a program. Nodes of this graph represent procedures, and edges represent the calling relationship among the procedures. Based on this call graph, for example, a program analysis unit $20_1$ shown in FIG. 3 graphically displays the nodes as circles and the edges as arrows. When the call graph is graphically displayed, the programmer not only can visually recognize the calling relationship among the procedures but also can easily understand the structured level and contents of a program or can easily detect an unwanted procedure call.

The "flow graph" shows the flow of control in a given procedure. Nodes of this graph represent fundamental blocks (each consisting of a continuous sentence sequence, and after control shifts to the first sentence, it reaches to the last sentence without any halt or branch in the middle of execution), and edges represent the flow of control among the fundamental blocks. Based on this flow graph, for example, a program analysis unit $20_2$ shown in FIG. 3 graphically displays the nodes as circles and the edges as arrows.

As for this flow graph, when its information is graphically displayed, the control flow in that procedure can be visually recognized, and an unwanted control flow can be easily detected. For example, a dead code that control cannot reach is a node which cannot be reached even if the control follows the edges from an entrance node. However, such code can be easily detected since it does not have any link from the entrance node.

The "data flow information" is information as a result of analysis of the data flow such as alias information of a pointer, definition-use chain information that indicates the use location of a variable defined at a given location, for example. Using this data flow information and similar information, for example, a data flow anomaly can be inspected. The data flow anomaly is a combination of illegal events with respect to data. All data must be used while keeping given rules, i.e., each data is used after it is defined, and is undefined finally. An illegal combination that does not keep such rules causes data flow anomaly.

Even when data flow anomaly is present, source code can be compiled. However, upon executing the compiled program in practice, data flow anomaly may appear when control takes an anomalous path. Hence, such anomaly is preferably removed in advance in the process of source code. Data flow anomaly detection is known in the art, as disclosed in Japanese Patent Application Nos. 9-32415 and 9-32452, by the present applicant.

The "program dependence graph" expresses control dependence in a program (dependence among functions), and data dependence (when data are substituted in functions) in the form of graph. When the program dependence graph is generated, for example, influence range analysis of a program can be executed. The influence range analysis analyzes the range of influence imposed when a certain location (one sentence or one variable) in a program has been changed.

The "module I/O information" pertains to I/Os of modules (e.g., functions in C) that form a program. This information describes I/O information using I/O functions and global variables in addition to I/Os as arguments and return values.

The "metrics information" pertains to numeration indices of software. The software analysis apparatus of this embodiment measures metrics which represent quantitative complexity, and those which represent qualitative complexity, and generates respective information. As metrics of quantitative complexity, two different kinds of quantities, i.e., a size metric that measures the physical description quantity of a program, and cyclomatic number that measures the complexity of a control structure are measured. On the other hand, module cohesion and module coupling relating to the contents of modules are measured, and are representative of the qualitative complexity of the software.

The "redundancy information" pertains to a redundant sentence that does not influence output in a single procedure. Since a redundant sentence does not influence output, if it is deleted from the source code, the external output remains unchanged. Hence, by confirming such redundant sentences in accordance with this redundancy information and taking measures against them, unintended operation can be prevented.

The "maintenance document information" is a document group used upon maintaining a program. More specifically, this information describes lists of procedures, types, variable names defined in a program, and how the individual procedures are related, for example. This "maintenance document information" is used when a given programmer wants to understand a program created by another programmer. By acquiring the "maintenance document information", information can be provided in the hypertext format, and is much more convenient compared to paper-based documents.

The program analysis information generation unit 11 shown in FIG. 1 sequentially generates various kinds of program analysis information mentioned above using a hierarchical structure, as shown in FIG. 2. The reason why such hierarchical structure is used is to use program analysis information in lower layers when program analysis information in an upper layer is generated. Upon completion of generation of a group of program analysis information for each layer, the program analysis information storage unit 12 sequentially stores these pieces of analysis information in the database as transactions.

For example, in order to generate a call graph or flow graph, information of the syntactic analysis tree of the lower layers is required. Also, in order to generate data flow information, information of the syntactic analysis tree of the lower layers, and information of a call graph and flow graph are required. Upon inspecting for data flow anomaly by an interactive process (to be described later) using the program analysis processing unit 15, the syntactic analysis tree, call graph, flow graph, and data flow information of various kinds of program analysis information hierarchically shown in FIG. 2 are required.

In this way, the relationship that requires program analysis information in lower layers, which has already been generated and stored in the information recording medium 13, upon generation of given program analysis information in an upper layer is called "hierarchy". In this embodiment, the program analysis information generation unit 11 generates program analysis information in the order from those in lower layers shown in FIG. 2, and the program analysis information storage unit 12 sequentially stores the obtained analysis information in the information recording medium 13. At this time, the program analysis information read unit 14 reads out program analysis information in a lower layer, which is required upon generating given program analysis information in an upper layer, from the information recording medium 13, and supplies it to the program analysis information generation unit 11.

If all pieces of program analysis information are generated by a batch process without using any transaction function, and are simultaneously stored in the information recording medium 13, especially, in case of a large-scale program, the data volume of source code in the source file 10 to be analyzed exceeds the memory capacity that can be mounted on a workstation or personal computer, and it consequently becomes impossible to continue analysis, thus wasting processing results obtained so far.

By contrast, in the software analysis apparatus of this embodiment, the program analysis information storage unit 12 classifies program analysis information generated by the program analysis information generation unit 11 in units of kinds of analysis information in the respective layers, and sequentially stores them as a database on the information recording medium 13 such as a hard disk, for example.

In this fashion, the analysis information volume to be stored in the memory by one process corresponds to each analysis information generated, and the limited memory capacity on the computer need not be considered. Hence, upon analyzing an especially large-scale program, program analysis rarely encounters memory shortage, and can be reliably done to the end.

Since analysis information in each layer in the data structure shown in FIG. 2 is stored as a transaction in the information recording medium 13 such as a hard disk or the like every time it is generated, of various kinds of program analysis information, those already stored in the information recording medium 13 are safely protected, even when some trouble other than memory shortage has taken place.

For example, when a large-scale program that requires several days from generation of a syntactic analysis tree until generation of a program dependence graph is to be analyzed, if a computer goes down due to some trouble in the middle of analysis, and data mapped on the memory are destroyed, at least those already stored in the information recording medium 13 as a database can be safely protected.

When analysis is restarted, the program analysis information already stored in the database need not be generated again, and the analysis can be restarted from a generation process of information which is not generated yet. Note that the operator instructs the apparatus of the restart position when the interrupted analysis is restarted. In this way, according to this embodiment, program analysis information that has been obtained before interruption can be effectively used, and repetitive operations can be avoided.

Note that this embodiment uses as a database object-oriented database software, and generates program analysis information using an object-oriented language, e.g., C++, for example. Such database is used for the following reason. That is, since the program analysis information has a complicated structure and relation such as a graph structure, if a relational database is used, it is hard to store information. Also, use of such a database is convenient, since program analysis information generated as an object on C++ can be stored in a structure as it is generated.

The internal arrangement and operation of the program analysis processing unit 15 will be explained below with reference to FIG. 3. FIG. 3 shows a plurality of program analysis units $20_1, 20_2, \ldots 20_i$ (these units will also be generally referred to as program analysis units 20 hereinafter). These program analysis units 20 execute various kinds of program analysis on the basis of the source code of the source file 10 and program analysis information stored as the database in the information recording medium 13 by the program analysis information storage unit 12 such as a hard disk or the like.

The program analysis units $20_1, 20_2, \ldots 20i$ are provided in correspondence with the kinds of analysis processes. In this embodiment, for example, the program analysis unit $20_1$ executes an analysis process for graphically displaying a call graph on the computer screen. With this process, the programmer can visually confirm the contents of the call graph, and easily understand the calling relationship among functions in the program. In this case, the program analysis unit $20_1$ loads source code, and reads out information of the syntactic analysis tree and call graph as program analysis information from the information recording medium 13 via the program analysis information read unit 14 shown in FIG. 1. The program analysis unit $20_2$ executes an analysis process for graphically displaying a flow graph on the computer screen. With this process, the programmer can visually confirm the contents of the flow graph in practice, and can easily understand the flows of variables in a given function. In such case, the program analysis unit $20_2$ loads source code, and reads out information of the syntactic analysis tree and flow graph as program analysis information from the information recording medium 13 via the program analysis information read unit 14 shown in FIG. 1.

The program analysis unit $20_i$ executes an analysis process that can analyze by a batch process using various kinds of program analysis information stored in the information recording medium 13 by the program analysis information storage unit 12, and stores the process results as a batch analysis result file in the information recording medium 13 again. During this batch process, the operator need not input any instructions, and the apparatus of this embodiment automatically analyzes. The batch analysis result file contains, e.g., metrics information that pertains to the program scale, redundancy information, maintenance document information.

In this way, the metrics information, redundancy information, and maintenance document information are generated as a result of a batch process. However, information generated as a result of a batch analysis process is not limited to those kinds of information. More specifically, the program analysis unit $20_i$ can be designed to implement various batch analysis processes as needed, and to consequently generate various kinds of analysis information corresponding to the individual batch analysis processes.

These program analysis units $20_1, 20_2, \ldots, 20_i$ fetch required program analysis information from the information recording medium 13, execute predetermined analysis processes, and display analysis results $21_1, 21_2, \ldots, 21_i$ on the computer screen using GUIs (Graphical User Interfaces) $22_1, 22_2, \ldots, 22_i$. Note that the GUIs $22_1, 22_2, \ldots, 22_i$ display the analysis process results so that the operator can observe their contents on the computer screen.

At this time, especially for the program analysis units other than the program analysis unit $20_i$ that executes the batch analysis process, when the operator wants to input some instructions upon observing the displayed results, he or she inputs instructions to the program analysis units $20_1$, $20_2, \ldots$ via the GUIs $22_1, 22_2, \ldots$ to make the program analysis units $20_1, 20_2, \ldots$ redo analysis processes and display their results. The program analysis progresses while repeating such processes. In this fashion, operation in which the operator inputs instructions to the computer via the GUIs $22_1, 22_2, \ldots$ and the computer implements analysis in response to these instructions is called an "interactive process".

Another example of the analysis process executed by the program analysis units 20 is the influence range analysis. In this process, the syntactic analysis tree, call graph, flow graph, program dependence graph, and module I/O information are read out from the information recording medium 13 as program analysis information, and the range of the influence of a given line in source code of the program is analyzed.

More specifically, source code of the program is displayed on the computer screen, and the operator designates a given line there and starts analysis. Then the computer displays the influence range of the designated line on source code in, e.g., a different color. When the operator wants to check the influence from another line, he or she designates that line to check the influence range of that line. With this analysis, the operator can confirm if the modified program has an influence that he or she intended.

Other examples of the analysis process done by the program analysis units 20 are structure analysis, data flow anomaly analysis, for example. In this embodiment, the data flow anomaly analysis is done by an interactive process, but may be implemented by a batch process.

Note that in FIG. 3 a GUI link unit 23 displays an arbitrary number of GUIs $22_1, 22_2, \ldots, 22_i$ on the computer screen, i.e., displays a plurality of GUI windows in relation to each other. For example, when the operator designates a given line of source program displayed on one GUI window, the corresponding portion of the flow graph displayed on another GUI window is displayed in a different color. Using this function, the operator can more easily understand the program contents.

In the software analysis apparatus of this embodiment, the operator may arbitrarily designate up to which analysis information the program analysis information generation unit 11 must generate. Upon development of a program, such request is often generated. If such designation is allowed, for example, when the operator designates to display a call graph alone, analysis information in upper layers need not be generated, and batch analysis processes can be done at higher speed.

The overall operation of the software analysis apparatus of this embodiment will be explained below with reference to FIG. 4. Referring to FIG. 4, if the operator designates a source code to be analyzed in step S1, it is checked in step S2 if the database of the program analysis information corresponding to the designated source code has already been stored in the information recording medium 13. If such database is found, the program analysis information read unit 14 reads out the program analysis information in step S3.

In step S4, the operator instructs the software analysis apparatus of program analysis information to be generated. For example, the operator instructs the range of analysis information to be generated in the order from the lowermost layer. When the process was interrupted due to some cause in the middle of the previous generation process, and that generation process is to be restarted, the operator instructs analysis information generation of which is to be restarted.

In step S5, the program analysis information generation unit 11 executes generation of program analysis information in accordance with analysis information generation instructions input by the operator. At this time, as a process progresses, the generated program analysis information is stored in turn in the memory. In step S6, the program analysis information storage unit 12 transfers and stores the generated program analysis information from the memory to the information recording medium 13 as a database.

Upon completion of generation of program analysis information required for program analysis in this way, the operator instructs the apparatus of program analysis processes to be executed in step S7. In response to this instruction, the program analysis processing unit 15 executes program analysis processes using corresponding ones of the program analysis units $20_1, 20_2, \ldots, 20_i$ shown in FIG. 3 (step S8).

Upon completion of this program analysis, it is checked in step S9 if another kind of program analysis is done. If YES in step S9, the flow returns to step S7; otherwise, the flow advances to step S10. It is checked in step S10 if another source code is to be analyzed. If YES in step S10, the flow returns to step S1; otherwise, the process ends.

A computer readable recording medium of the present invention will be described below. The software analysis apparatus of the present invention is implemented when the computer operates in accordance with a program stored in its ROM or RAM, for example. Alternatively, the software analysis apparatus may be implemented when a computer that loads an external program operates according to that program, Hence, when a computer mounts a recording medium that records such program, e.g., a floppy disk, CD-ROM, magnetooptical disk, magnetic tape, semiconductor memory, or the like, and loads the program therefrom, the present invention can be practiced on the computer.

Note that the present invention is not limited to the above embodiment, and various modifications and changes may be made within the scope of the invention. For example, in the above embodiment, when one kind of analysis information is generated in each layer, the obtained program analysis information is stored in a database. Alternatively, when generation of all kinds of analysis information in each layer is completed, or when a predetermined volume of information is stored in the memory, such information may be stored in a database. Also, every time a predetermined period of time has elapsed, the program analysis information obtained so far may be stored in a database.

To recapitulate, according to the present invention, since program analysis information generated by the program analysis information generation means is stored in a predetermined data recording medium in arbitrary units or at an arbitrary timing, program analysis information of a large-scale program can be safely obtained without causing any memory shortage in the middle of analysis even when the memory capacity mounted on the computer is limited.

Even when the analysis process is interrupted due to some trouble, information stored in the data recording medium so far is safely protected. Hence, the process is resumed from the interrupted one, thus avoiding repetitive processes and greatly improving analysis efficiency.

When some analysis process is to be interactively done after generation of analysis information, since analysis information already stored in the database can be directly used, the time required for generating that analysis information can be omitted, and the wait time of the operator can be reduced compared to a conventional system which generates analysis information from the beginning every time new analysis process is started.

What is claimed is:

1. A software analysis apparatus comprising:
   program analysis information generation means for automatically generating program analysis information required for analyzing a computer program;
   program analysis information storage means for classifying the program analysis information generated by said program analysis information generation means in an arbitrary unit or at an arbitrary timing, and sequentially storing the program analysis information in a predetermined data recording medium; and
   program analysis means for executing program analysis by reading out the program analysis information from said data recording medium.

2. An apparatus according to claim 1, wherein said program analysis means reads out the program analysis information from said data recording medium, and executes program analysis by an interactive process with an operator.

3. An apparatus according to claim 1, wherein said program analysis means reads out the program analysis information from said data recording medium, and executes program analysis by a batch process.

4. An apparatus according to claim 3, wherein said program analysis means generates at least one of metrics information, redundancy information, data flow anomaly information, and maintenance document information by the batch process.

5. An apparatus according to claim 1, wherein said program analysis information generation means generates a plurality of kinds of program analysis information in turn, and said program analysis information storage means stores the program analysis information in said data recording medium every time each kind of program analysis information is generated.

6. An apparatus according to claim 5, further comprising range instruction means for instructing a range of the plurality of kinds of program analysis information to be generated.

7. An apparatus according to claim 1, wherein said program analysis information storage means stores the program analysis information in said data recording medium as a database.

8. An apparatus according to claim 1, wherein the program analysis information includes at least one of:
- a syntactic analysis tree generated on the basis of source code of the computer program;
- a symbol table indicating meanings of symbols used in source code of the computer program;
- a call graph or flow graph generated on the basis of the syntactic analysis tree;
- data flow information generated on the basis of the syntactic analysis tree, symbol table, flow graph, and call graph; and
- a program dependence graph or module I/O information generated on the basis of the syntactic analysis tree, symbol table, flow graph, call graph, and data flow information.

9. An apparatus according to claim 8, wherein said program analysis information generation means generates the syntactic analysis tree and symbol table, call graph and flow graph, data flow information, and program dependence graph and module I/O information in the order listed.

10. An apparatus according to claim 9, wherein said program analysis information storage means stores each program analysis information in said data recording medium every time said program analysis information generation means generates one of the syntactic analysis tree and symbol table, call graph, flow graph, data flow information, program dependence graph, and module I/O information.

11. A software analysis apparatus for generating pro information required for analyzing a computer program, comprising:
- means for hierarchically registering the generated program analysis information in a database in units of analysis objectives;
- means for implementing analysis of the hierarchically registered program analysis information by reading out the program analysis information already registered in a predetermined layer in correspondence with an analysis objective upon analyzing the computer program.

12. An apparatus according to claim 11, wherein the database is an object-oriented database.

13. A software analysis method, comprising:
- automatically generating program analysis information required for analyzing a computer program;
- classifying the program analysis information in an arbitrary unit or at an arbitrary timing;
- sequentially storing the program analysis information in a predetermined data recording medium; and
- executing program analysis by reading out the program analysis information from said data recording medium.

14. A method according to claim 13, wherein the program analysis step includes the step of reading out the program analysis information from said data recording medium, and executing program analysis by an interactive process with an operator.

15. A method according to claim 13, wherein the program analysis step includes the step of reading out the program analysis information from said data recording medium, and executing program analysis by a batch process.

16. A method according to claim 15, wherein the program analysis step includes the step of generating at least one of metrics information, redundancy information, data flow anomaly information, and maintenance document information by the batch process.

17. A method according to claim 13, wherein the program analysis information generation step includes the step of generating a plurality of kinds of program analysis information in turn, and the program analysis information storage step includes the step of storing the program analysis information in said data recording medium every time each kind of program analysis information is generated.

18. A method according to claim 13, wherein the program analysis information storage step includes the step of storing the program analysis information in said data recording medium as a database.

19. A method according to claim 13, wherein the program analysis information includes at least one of:
- a syntactic analysis tree generated on the basis of source code of the computer program;
- a symbol table indicating meanings of symbols used in source code of the computer program;
- a call graph or flow graph generated on the basis of the syntactic analysis tree;
- data flow information generated on the basis of the syntactic analysis tree, symbol table, flow graph, and call graph; and
- a program dependence graph or module I/O information generated on the basis of the syntactic analysis tree, symbol table, flow graph, call graph, and data flow information.

20. A method according to claim 19, wherein the program analysis information generation step includes the step of generating the syntactic analysis tree and symbol table, call graph and flow graph, data flow information, and program dependence graph and module I/O information in the order listed.

21. A method according to claim 20, wherein the program analysis information storage step includes the step of storing each program analysis information in said data recording medium every time one of the syntactic analysis tree and symbol table, call graph, flow graph, data flow information, program dependence graph, and module I/O information is generated in the program analysis information generation step.

22. A software analysis method for generating program analysis information required for analyzing a computer program, comprising:
- hierarchically registering the generated program analysis information in a database in units of analysis objectives, and
- implementing analysis by reading out the program analysis information already registered in a predetermined layer in correspondence with an analysis objective upon analyzing the computer program.

23. A method according to claim 22, wherein the database is an object-oriented database.

24. A computer readable recording medium recording a computer program for making a computer implement:
- a program analysis information generation function of automatically generating program analysis information required for analyzing a computer program;
- a program analysis information classification function of classifying the program analysis information generated by the program analysis information generation function in an arbitrary unit or at an arbitrary timing;
- a program analysis information storage function of sequentially storing the classified program analysis information generated by the program analysis information classification function in a predetermined data recording medium; and a program analysis function of executing program analysis by reading out the classified program analysis information from said data recording medium.

25. A medium according to claim 24, wherein the program analysis function reads out the program analysis information from said data recording medium, and executes program analysis by an interactive process with an operator.

26. A medium according to claim 25, wherein the program analysis function reads out the program analysis information from said data recording medium, and executes program analysis by a batch process.

27. A medium according to claim 26, wherein the program analysis function generates at least one of metrics information, redundancy information, data flow anomaly information, and maintenance document information by the batch process.

28. A medium according to claim 24, wherein the program analysis information generation function generates a plurality of kinds of program analysis information in turn, and the program analysis information storage function stores the program analysis information in said data recording medium every time each kind of program analysis information is generated.

29. A medium according to claim 24, wherein the program analysis information storage function stores the program analysis information in said data recording medium as a database.

30. A medium according to claim 24, wherein the program analysis information includes at least one of:
   a syntactic analysis tree generated on the basis of source code of the computer program;
   a symbol table indicating meanings of symbols used in source code of the computer program;
   a call graph or flow graph generated on the basis of the syntactic analysis tree;
   data flow information generated on the basis of the syntactic analysis tree, symbol table, flow graph, and call graph; and
   a program dependence graph or module I/O information generated on the basis of the syntactic analysis tree, symbol table, flow graph, call graph, and data flow information.

31. A medium according to claim 30, wherein the program analysis information generation function generates the syntactic analysis tree and symbol table, call graph and flow graph, data flow information, and program dependence graph and module I/O information in the order listed.

32. A medium according to claim 31, wherein the program analysis information storage function stores each program analysis information in said data recording medium every time the program analysis information generation function generates one of the syntactic analysis tree and symbol table, call graph, flow graph, data flow information, program dependence graph, and module I/O information.

33. A computer readable storage medium recording a program for making a computer implement a function of:
   generating program analysis information required for analyzing a computer program,
   hierarchically registering the generated program analysis information in a database in units of analysis objectives, and
   implementing analysis by reading out the program analysis information already registered in a predetermined layer in correspondence with an analysis objective upon analyzing the computer program.

34. A medium according to claim 33, wherein the database is an object-oriented database.

35. The apparatus of claim 1, wherein said program analysis means analyzes where a given line in a source code of the computer program has an influence on the source code.

36. The method of claim 13, wherein said automatically generating program analysis information includes analyzing where a given line in a source code of the computer program has an influence on an execution of the source code.

37. The computer readable recording medium of claim 24, wherein the program analysis function includes a function of determining where a given line in a source code of the computer program has an influence on an execution of the source code.

* * * * *